July 19, 1960 M. M. HEFFERNAN ET AL Re. 24,845

CRIB CANOPY

Original Filed May 14, 1958

INVENTORS
JOHN J. HEFFERNAN
MARGARET M. HEFFERNAN

BY A. Yates Dowell
ATTORNEY

United States Patent Office

Re. 24,845
Reissued July 19, 1960

24,845

CRIB CANOPY

Margaret M. Heffernan and John J. Heffernan,
New Canaan, Conn.

Original No. 2,883,678, dated Apr. 28, 1959, Ser. No. 735,319, May 14, 1958. Application for reissue Oct. 6, 1959, Ser. No. 844,841

2 Claims. (Cl. 5—93)

Matter enclosed in heavy brackets [ ] appears in the original patent but forms no part of this reissue specification; matter printed in italics indicates the additions made by reissue.

This invention relates to the care of the species and to equipment employed particularly in the care of infants and small children during both their waking and sleeping hours and with particular consideration to their safety and welfare during periods in which they are left alone unattended.

Infants and young children during early life spend a great amount of their time in baby beds, cribs or play pens and the tendency is for the child in the natural course of growth and development to try to climb from the crib, bed or playpen and until they have accomplished this feat, it sometimes results in falls and serious injury to the child.

In the use of conventional cribs where an infant or child is not constantly attended there are certain hazards since there is no way to prevent the child from climbing over the sides of the crib and consequently, this knowledge is the cause for serious concern. Further, conventional cribs have little means of helping an active child to be kept on a healthful routine including the necessary sleep as well as protection from anything which might fall into the crib.

It is an object of the invention to overcome the difficulties enumerated and to provide a cover or canopy for the crib which will insure the child remaining in the crib and thereby preclude climbing out and falling and sustaining injury.

Another object of the invention is to provide a cover or canopy for a crib which will attract the attention and provide entertainment for the child with such canopy applied in a manner to avoid the frantic fear on the part of the child due to bodily restraint and with the canopy so fitted that a child cannot become entangled or thrust arms or head around the edge of the canopy and from the crib.

A still further object of the invention is to provide a crib cover or canopy which can be easily and quickly applied to the conventional crib, may be removed without difficulty and which can be maintained clean and sanitary.

Figure 1:
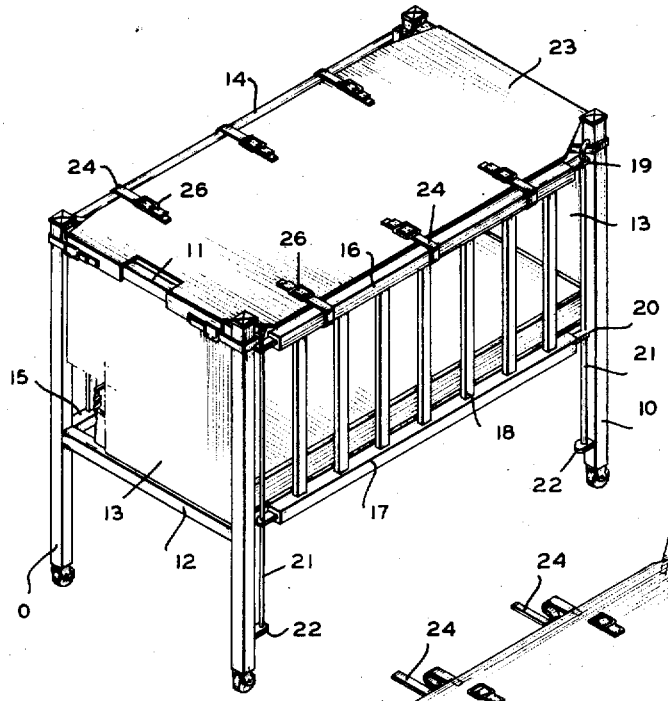
Figure 2:
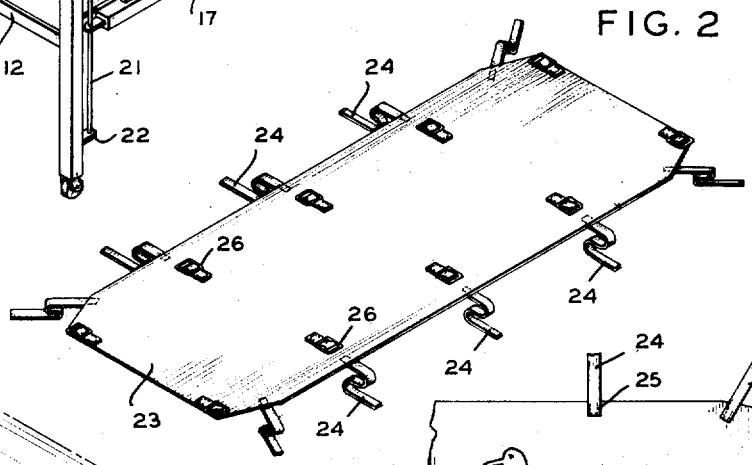
Figure 3:
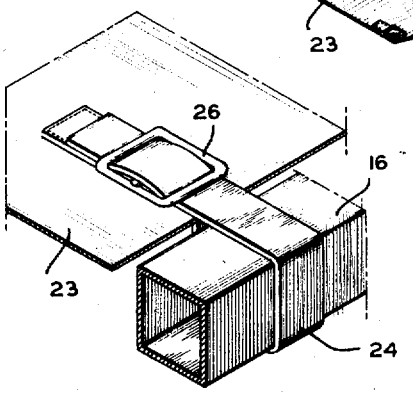
Figure 4:
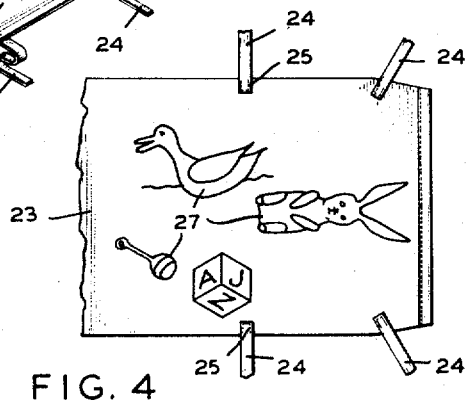

Other objectives and advantages of the invention will be apparent from the following description taken in conjunction with the accompanying drawing wherein:

Fig. 1 is a perspective illustrating a conventional crib with the invention applied thereto;

Fig. 2, a perspective of the crib cover or canopy and its attaching straps and buckles;

Fig. 3, an enlarged fragmentary perspective illustrating the manner of attachment of the canopy; and Fig. 4, a fragmentary perspective of the decorated underside of the cover.

Briefly stated, the invention is a sheet which may be of strong canvas or other material of generally rectangular shape, with slightly reduced ends so that it will fit over the top of the crib and extend between the posts at the ends of the crib. A series of straps are provided at each side of the sheet and buckles are attached on the upper surface of the sheet so that the straps may be disposed about the top bars at the side of the crib and around the corner posts.

With continued reference to the drawing, a conventional crib is disclosed having four corner posts 10 connected at the ends of the crib by top and bottom rails 11 and 12 and end panels 13.

The crib is also provided with sides including top and bottom rails 14 and 15 with spaced vertical bars 18 on the rear side of the crib and a movable frame of top and bottom rails 16 and 17 with similar vertical bars 18 and having perforated extensions 19 and 20 received on retaining rods 21 attached to the front corner posts by brackets 22 and permitting the front of the crib to be raised and lowered. The structure just described is conventional and forms no part of the invention.

In order to confine the infant or small child within the crib, in accordance with the present invention, a cover or canopy is provided in the form of a generally rectangular sheet 23, of canvas or other relatively strong material, having its ends of slightly reduced width to fit between the corner posts at each end of the crib, the sheet being of a width corresponding to the space between the front and rear sides of the cirb and being adapted to be secured in such a position.

In order to secure the sheet 23 in a position as a cover or canopy it is provided along its sides with a series of spaced *attaching members such as* straps 24 which may be secured to the sheet by stitching 25 or in any other desired manner. Above the straps at each side of the crib are attached *cooperating attaching members or fasteners such as* buckles 26 in which the straps 24 are adapted to be engaged, such straps being disposed about the top rail at each side of the crib. The location of the buckles on the top side of the cover or canopy beyond the reach of the child prevents them from being reached and, therefore, they cannot easily be unfastened. At each corner of the canopy there is provided a buckle 26 in which the strap nearest the end of the sheet is adapted to be engaged after the strap is disposed around the corner post as illustrated in Figure 1.

The device is adapted to be secured taut in extended condition with the space between the canopy and the side ends of the crib too narrow to permit the head or arms of the child to be forced to any appreciable extent from the crib and of course the child cannot get out of the crib.

The canopy is adapted to have certain ornamental or decorative designs 27 on its underside to attract the attention of the child to occupy the mind and provide interesting entertainment. The canopy likewise will protect the occupant of the crib from the bright lights and the sun as well as from precipitation or objects falling in the area of the crib and the canopy is retained in place without the necessity of other attaching means as might cause injury to the child and simplify application and removal of the canopy as well as to permit application and adjustment with regards to cribs of slightly varying dimensions. To afford access to the crib, it is only necessary to unfasten the front cover at the front side so that the side of the crib can be lowered when desired and the cover or canopy folded back over the other side of the crib.

The canopy is of such a character that it may easily be laundered if soiled, and it will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

*1.* A crib cover comprising a rectangular flexible sheet member, a plurality of buckle elements secured in spaced relation on one side of the sheet member along opposite side edges thereof, said sheet member converging angularly from said opposite side edges toward the ends thereof for accommodating the ends of the cover between the cornerposts of a crib, strap elements equal in number to the buckle elements and secured on the other side of said sheet member in opposed relation to the buckle elements, additional buckle elements secured immediately adjacent the edges of the ends of said sheet member at the intersection with said converging portions, and additional strap elements secured on the other side of said sheet member in angular relation to said converging portions for connection to said additional buckle elements to facilitate the formation of turned down edges of said sheet member when installed on a crib.

*2. A crib cover comprising a generally rectangular sheet member, a plurality of fasteners secured in spaced relation to one side of the sheet member along opposite side edges thereof, said sheet member being of reduced width at its ends to provide cutaway corner portions of said sheet member for accommodating the cornerposts of a crib, cooperating attaching members secured on the other side of said sheet member in opposed relation to*

*said fasteners, said attaching members being equal in number to said fasteners and detachably connectable thereto, additional fasteners each secured to said sheet member adjacent a said cutaway corner portion at one end of said cutaway corner portion, and additional attaching members each secured to said sheet member adjacent a said cutaway corner portion at the end of said cutaway corner portion opposite from said additional attaching member.*

References Cited in the file of this patent or the original patent

UNITED STATES PATENTS

| | | |
|---|---|---|
| 135,138 | McNamara | Jan. 21, 1873 |
| 234,016 | Fosburgh | Nov. 2, 1880 |
| 979,506 | Jones | Dec. 27, 1910 |
| 1,216,719 | Morrill | Feb. 20, 1917 |
| 1,362,987 | Dunn | Dec. 21, 1920 |
| 1,897,525 | McGill | Feb. 14, 1933 |
| 1,961,637 | Lindsey | June 5, 1934 |
| 2,382,851 | Berman | Aug. 14, 1945 |
| 2,571,406 | Ball | Oct. 16, 1951 |
| 2,699,794 | Potter | Jan. 18, 1955 |

FOREIGN PATENTS

| | | |
|---|---|---|
| 771,126 | Great Britain | Mar. 27, 1957 |